Oct. 1, 1968  J. L. POOL ET AL  3,404,337
MAGNETIC CHIP GAUGE
Filed Nov. 8, 1965
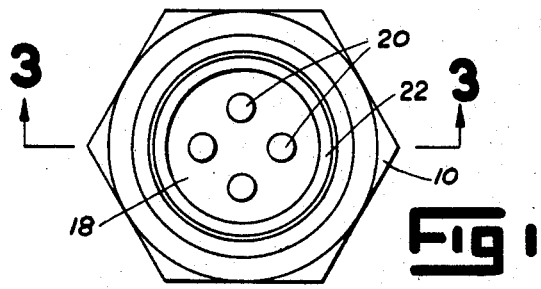
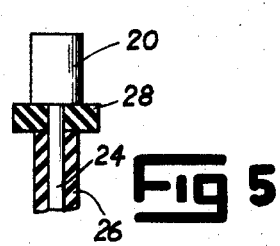
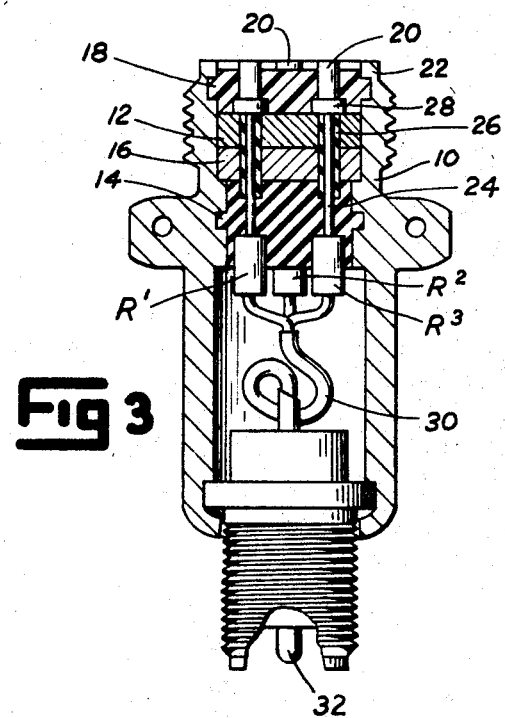
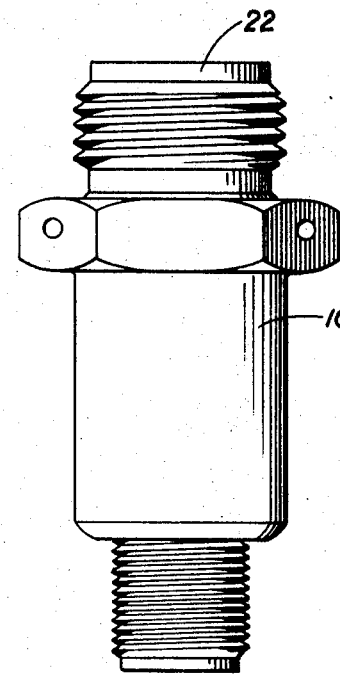
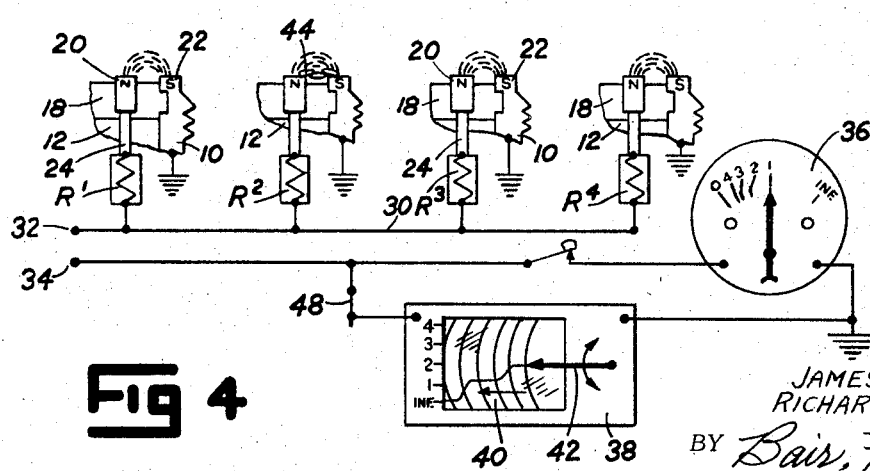
INVENTORS:—
JAMES L. POOL and
RICHARD K. GRAHAM
BY Bair, Freeman &
Molinare ATTORNEY

United States Patent Office 3,404,337
Patented Oct. 1, 1968

3,404,337
MAGNETIC CHIP GAUGE
James L. Pool and Richard K. Graham, Clarinda, Iowa, assignors to Lisle Corporation, Clarinda, Iowa, a corporation of Iowa
Filed Nov. 8, 1965, Ser. No. 506,777
4 Claims. (Cl. 324—41)

ABSTRACT OF THE DISCLOSURE

A magnetic chip gauge which monitors the quanity of metallic chips bridging a plurality of magnetic gaps by measuring the flow of current across the gaps. Since such chips are of low electrical resistance, in order to provide a distinction between varying numbers of gaps which are so bridged, an indicating circuit is arranged with the gaps in parallel, and each gap has in series therewith a high resistance element, which elements are also in the parallel circuit. Therefore a single meter for the current flow shows a step-like increase as successive gaps are bridged by chips.

---

This invention relates to a magnetic chip gauge wherein a magnet is adapted to be positioned in a container for attracting ferrous particles from liquid in such container, the gauge being operable to determine the amount of ferrous material collected.

One object of the invention is to provide an electrically operable magnetic chip gauge wherein magnetic means having a north pole and a south pole spaced from each other is connected in series circuit with a high resistance element and a current flow indicating means whereby, upon the bridging of the north and south poles with ferrous particles, the resistance through the circuit will be reduced from substantially infinity to substantially that of the resistance element thereby indicating the collection of ferrous particles as distinguished from the absence of ferrous particles bridging the poles of the magnetic means.

Another object is to provide an arrangement for gauging the amount of ferrous particles by the provision of a plurality of magnetic means instead of a single magnetic means, and a high resistance element in series with each of the magnetic means whereby the current flow indicating means will indicate the progressive bridging of the plurality of magnetic means with collected ferrous particles.

Still another object is to provide a gauge of the character disclosed in the form of a plug which is removable with respect to a container of liquid whereupon the ferrous particles accumulated on the poles of the magnetic means may be removed therefrom.

A further object is to provide magnetic means effective to attract ferrous particles from fluid in a housing or the like and means to measure the amount of material so collected by providing a plurality of magnetic means and a high resistance element for each in a seriesparallel circuit arrangement so that as successive magnetic means are bridged by collected ferrous particles the electric current flowing through the indicating circuit will increase by definite steps which on an indicator for current flow will show how many of the magnetic means is bridged with ferrous particles.

Still a further object is to provide means for continuously recording the flow of electricity through the electric indicating circuit to provide a running record of ferrous particles collected.

With these and other objects in view, our invention consists in the construction, arrangement and combination of the various parts of our magnetic chip gauge, whereby the objects above contemplated are attained, as hereinafter more fully set forth, pointed out in our claims and illustrated in detail on the accompanying drawing, wherein:

FIG. 1 is an enlarged plan view of a magnetic chip gauge embodying my invention;

FIG. 2 is a side elevation thereof;

FIG. 3 is a vertical sectional view on the line 3—3 of FIG. 1;

FIG. 4 is an electro-diagrammatic view of the magnetic plug shown in FIGS. 1, 2 and 3 and includes a current flow indicator and a recorder, and FIG. 5 is an enlarged sectional view through a pole piece of FIG. 3.

On the accompanying drawing we have used the reference numeral 10 to indicate a plug such as one of screw-threaded type that can be screwed into the drain plug opening of a transmission housing or the like. A permanent magnet 12 is secured in the plug 10 between a ferrous plate 16 and cast-in epoxy or the like 18. The magnet 12 is shown as of disc type and one pole is at its upper surface whereas the other pole is at its lower surface. Potting compound 14 seals the parts 12 and 14 in the plug 10.

The plug 10 is provided with one or more magnetic gaps comprising one or more magnetic pole pieces 20 and a rim 22 of the plug. Magnetism charges the pole pieces 20 with the polarity of the upper surface of the magnet 12 and the rim 22 with the opposite polarity from the lower surface of the magnet through the ferrous plate 16 such as north and south, respectively, as indicated in FIG. 4.

A current conductor 24 extends downwardly from each pole piece 20 and is insulated from the magnet 12 and the ferrous plate 16 by an insulating sleeve 26 and an insulating washer 28. At the lower end of each conductor 24 is a resistor R and these resistors are designated $R^1$, $R^2$, $R^3$ and $R^4$ inasmuch as four of the pole pieces 20 are illustrated. Actually, the plug may be made with one such pole piece or the number may be less or greater than four depending on (1) space limitations (which limit the number that can be used) and (2) greater gauging sensitivity (accomplished by increasing the number of pole pieces and likewise resistors).

The lower ends of the resistors R are all electrically connected together and to a lead 30 which in turn is connected to a terminal 32.

In FIG. 4 the electric circuit is shown from which it will be obvious that the resistors $R^1$, $R^2$, $R^3$ and $R^4$ are connected in series with the pole pieces 20 and the plurality of resistors and pole pieces are connected in parallel or shunt with each other whereas the rim 22 of the plug 10 constituting the other pole piece is a grounded connection. A second terminal 34 is illustrated and current is supplied to these terminals to constitute an electrical indicating circuit in conjunction with a current flow indicator 36 and/or a recorder 38. The current flow indicator 36 may be a milliammeter, a voltmeter or an ohmmeter whereas the recorder 38 may have a time driven tape 40 and a recording arm 42 coacting therewith and responsive to the amount of current flowing through the recorder.

FIG. 4 indicates four magnetic fields in relation to the plug rim 22 and the four pole pieces 20, and it will be noted that one of the magnetic gaps is bridged by collected particles 44 (for the resistor $R^2$). The current flow indicator 36 is arbitrarily marked to indicate the shorting out of one, two, three or all four of the resistors and its action may be illustrated by the following formulas with T indicating "total":

| No. of short circuits | Calculations (R=10,000Ω) | | Ohms |
|---|---|---|---|
| 0 | | $R^T=$ | Very high |
| 1 | $1/R^T = 1/R^1 = 1/10,000$ | $R^T=$ | 10,000 |
| 2 | $1/R^T = 1/R^1 + 1/R^2 = 2/10,000$ | $R^T=$ | 5,000 |
| 3 | $1/R^T = 1/R^1 + 1/R^2 + 1/R^3 = 3/10,000$ | $R^T=$ | 3,333 |
| 4 | $1/R^T = 1/R^1 + 1/R^2 + 1/R^3 + 1/R^4 = 4/10,000$ | $R^T=$ | 2,500 |

The above formulas are standard for resistors in parallel. When there are no short circuits caused by the accumulation of particles 44 the resistance in the circuit would be very high. This is because the only flow across from the electrodes indicated N and S in FIG. 4 would be through the liquid which would vary depending upon its character but in the case of lubricating oil would be quite high (resistance close to infinity which is the same as current flow close to zero). Then by using resistors R, each of a value such as 10,000 ohms, when there is one short circuit the 10,000 ohm value would show up on the indicator 36 as "1" if the indicator is an ohmmeter. This for instance, might be the midpoint between zero and infinity resistance (0 and INF) in which case if the number of short circuits were two, the resistance would be cut in half and the indicator needle would stand at half way between zero and 1 (the 5,000 ohm mark) shown on the indicator in FIG. 4. Similarly, the shorting of three resistors would give a reading at 3,333 ohms and the shorting of all four would give a reading of 2,500 ohms as shown on the calculation chart.

The circuit may be arranged with a push button 46 for the indicator 36 and a switch 48 for the recorder 38, or any suitable control arrangement may be provided.

From the foregoing specification it will be obvious that we have provided a magnetic chip gauge suitable for indicating and/or recording the flow of electricity through a system of resistors and magnetic means variably affected by the quantity of ferrous particles 44 collected thereon as illustrated in FIG. 4. A gauge of this character is particularly valuable in the operation of airplane engines and the like where malfunctioning caused by an accumulation of ferrous particles should be promptly called to the attention of the pilot.

The number of resistors brought into the circuit by the shorting across of the plug rim-pole piece 20 combination effects a variation in the flow of electricity through the indicator circuit upon the accumulation of ferrous particles so that a feasible indication of such accumulation is had. We disclose a magnetic chip gauge in which (when there is only one resistor R and one pole piece 20) the indicator 36 will read either 10,000 ohms (1) or infinity (INF) and will thus indicate whether or not there is an accumulation of ferrous particles 44. When a plurality of the pole pieces and corresponding resistors are arranged in the series-parallel circuit shown in FIG. 4 a quantitative indication is had by readings on the indicator to show the number of individual magnetic means short circuited by the collected ferrous particles. The particles offer some resistance to current flow but the ohmage value is quite low so that they produce the effect of a substantial short circuit, thereby having the effect of cutting in the resistors successively as additional pole pieces 20 are bridged by particles 44 in relation to the plug rim 22. Accordingly, an effective gauge of the quantity of collected particles is provided to indicate to the operator of an engine or the like the degree of particles collected so that he can remove the plug and clean the particles therefrom at predetermined times commensurate with the amount of collected particles, instead of haphazardly or at specified time intervals which might be inadequate because of an excessive rate of particle collection. The indicator 36 can be operated at any time to show how many of the magnetic means has collected particles and the recorder 38 will provide a running record so that when three or all four of the magnetic means are indicated as having collected particles the plug can be removed and the particles cleaned therefrom.

Some changes may be made in the construction and arrangement of the parts of our magnetic chip gauge without departing from the real spirit and purpose of our invention, and it is our intention to cover by our claims any modified forms of structure or use of mechanical equivalents which may reasonably be included within their scope.

We claim as our invention:

1. In a magnetic chip gauge, plural magnetic means, means for supporting said magnetic means in a housing containing fluid in which ferrous particles of low resistance may be present, said magnetic means being effective to attract such particles, and means to measure the amount of ferrous material so attracted comprising an electric circuit including a high resistance element, connected in series with each of said magnetic means and connected in parallel with each other, and a single current flow indicating means and a power source connected in series with all of said high resistance elements and all of said magnetic means, whereby ferrous material attracted by successive magnetic means will progressively reduce the resistance in said current flow indicating circuit and thereby increase the current flow therethrough to operate the same for measurable quantitative indicating purposes.

2. A magnetic chip gauge according to claim 1 wherein said plural magnetic means is supported by a single plug which is removable with respect to such housing whereupon the ferrous particles bridging said poles may be removed therefrom.

3. A magnetic chip gauge according to claim 1 wherein said current flow indicating means continuously records such flow.

4. A magnetic chip gauge according to claim 1 wherein said means for measuring current flowing through said electric circuit is responsive to the change in resistance thereof resulting from deposit of such ferrous particles in bridging relation to the successive magnetic means.

References Cited
UNITED STATES PATENTS 2,936,890  5/1960  Botstiber _____ 335—305 X RUDOLPH V. ROLINEC, *Primary Examiner.*

P. A. URIBE, *Assistant Examiner.*